Jan. 26, 1960  G. W. D'ARCEY ET AL  2,922,357
WAFFLE IRON
Filed Aug. 22, 1956

JOSEPH J. RYAN &
GERARD W. D'ARCEY
INVENTORS
BY
Paul B. Fike
Patent Agent

United States Patent Office 2,922,357
Patented Jan. 26, 1960

2,922,357
WAFFLE IRON

Gerard W. D'Arcey and Joseph J. Ryan, Campbell, Calif., assignors of one-fourth to Paul B. Fihe, San Jose, Calif.

Application August 22, 1956, Serial No. 605,548

4 Claims. (Cl. 99—379)

The present invention relates to cooking utensils and more particularly to waffle irons.

It will have been observed that substantially all waffle irons incorporate upper and lower gridded cooking plates that are hingedly connected in a manner permitting the upper plate to rise and fall relative to the lower plate. This arrangement permits the expansion of the batter during the cooking process which may oftentimes lift the upper plate one quarter of an inch or more above the lower. The arrangement also permits the upper plate to thereafter settle again under its own weight into abutting relation with the lower plate as the cooking cycle nears completion. The result of such settling of the upper plate is quite obviously a squashing of the batter which substantially negatives the production of a light, fluffy, open-textured waffle. In short, as a result of the weight of the upper plate of the waffle iron, waffles regrettably do not have the desirable "lightness" obtainable in the baking of cakes, bread and other similar products.

Accordingly, it is a general object of the present invention to provide a waffle iron arranged to preclude squashing of the cooking batter so that the cooked waffle is of a light, fluffy texture with an appreciably enhanced flavor.

A feature of the invention relates to the incorporation in a waffle iron of means that are automatically operative in response to the raising or displacement of the upper plate from the lower plate to maintain the displaced, separated relationship of the two plates.

A further feature relates to the simple, albeit effective character of such displacement-maintaining means which holds the displaced plates in balanced-separated relationship.

Additionally, it is a feature of the invention to incorporate a mechanism operable to release the above-mentioned displacement-maintaining means whereby the plates of the waffle iron can return to abutting relationship.

A further feature relates to the automatic actuation of such release mechanism simultaneously with the pivotal raising of the upper plate of the waffle iron when a cooked waffle is to be removed from the iron.

Figure 1:
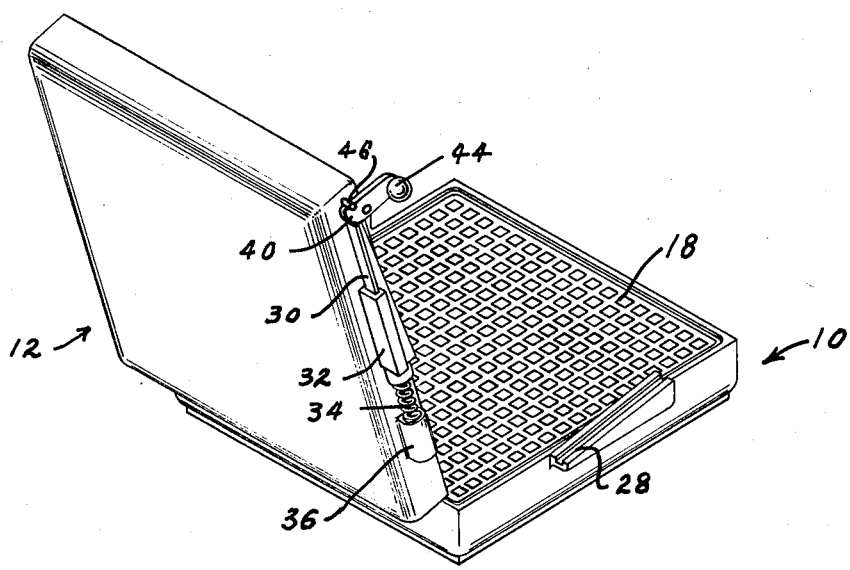
Figure 1:
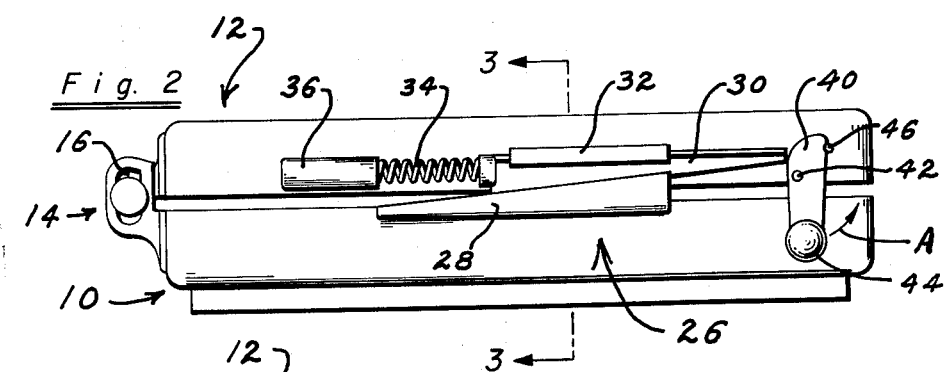
Figure 1:
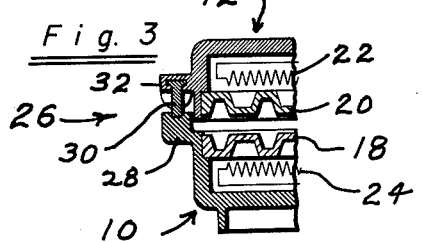

These and other objects and features of the invention as well as the advantages stemming from its use will become more apparent from a perusal of the following description of a preferred embodiment of the invention as shown in the accompanying drawing wherein:

Fig. 1 is a perspective view of a waffle iron constituting such preferred embodiment of the invention, and in its "open" position for receiving waffle batter, Fig. 2 is a side elevational view of the waffle iron in its "closed" position, and Fig. 3 is a fragmentary sectional view taken substantially along line 3—3 of Fig. 2.

As shown in the drawing, the waffle iron consists generally of a base portion 10 and a lid portion 12 that are adapted to be placed in superposed relationship, as can be clearly visualized by reference to Fig. 2. With continued reference to Fig. 2, it will be observed that a conventional hinge structure, generally indicated at 14, is arranged to pivotally connect the base and lid portions 10 and 12 of the iron so that such lid portion may be pivotally raised to the open position illustrated in Fig. 1 to permit insertion of the waffle batter. It will also be observed that the conventional hinge 14 incorporates a slot 16 that permits limited vertical displacement of the lid portion 12 from the base portion 10.

The base and lid portions 10 and 12 of the waffle iron respectively incorporate similar gridded plates 18 and 20 which are heated by the passage of electric current through heating coils 22 and 24 in a conventional manner. Thus, when batter has been placed on the lower plate 18 and the lid portion 12 has been closed thereover to bring the upper plate 20 into engagement with the inserted batter, the supply of electric current to the heating coils 22 and 24 will heat those gridded plates to thereby instigate the cooking process. As the cooking process proceeds, an expansion of the batter occurs to effect an upward displacement or lifting of the lid portion 12 of the waffle iron.

In accordance with the present invention, means are provided to maintain the lid portion 12 and the upper gridded plate 20 incorporated therein in its lifted or elevated position, as illustrated in Fig. 2, after such position has been attained to thereby preclude subsequent squashing of the expanded, cooking batter. In its preferred form shown in the drawing, such means takes the form of like wedge mechanisms, as generally indicated at 26, which are positioned at substantially opposite sides of the iron. Only one wedge mechanism 26 appears in the drawing, but it will be understood that the other mechanism is substantially identical therewith. Each of such mechanisms includes a track 28 formed at the side of the lower plate 18 so as to be inclined slightly relative to the plane defined by such lower plate. A wedge 30 is supported from the upper plate 20 for movement within a suitable bracket 32 for movement in parallelism to the plane defined by such upper plate, the wedge 30 having an inclined surface arranged to engage the described track 28 secured adjacent the lower plate 18 when the upper and lower plates are brought into abutting relationship. Consequently, when the wedge 30 is moved in parallelism to the planes of the abutting upper and lower plates 18, 20, a vertical displacement of such plates relative to one another is effected. A spring 34 is compressed between one end of the wedge 30 and a spring housing 36 attached to the lid portion 12 of the iron, so that the force of the spring constantly urges the wedge 30 to the right as viewed in Fig. 2 thereby tending to lift the lid portion 12 from the base portion 10. Such lifting does not occur as a result of spring pressure alone since the force of the spring 34 is insufficient to overcome both the weight of the lid portion 12 and the frictional resistance existing between the wedge 30 and the track 28. However, when the cooking batter lifts the lid portion 12 in the manner previously described, the force of the spring is then sufficient to move the wedge 30 to the right and to the position shown in Fig. 2 whereat the upper gridded plate 20 is displaced approximately one quarter of an inch from its normal position of rest in abutting relationship with the lower gridded plate 18. It will be apparent that the force exerted by the expanding batter so as to lift the lid portion 12 will be supplemented by the force exerted by the spring 34. Once the upward displacement of the upper plate 20 (and the lid portion 12) has occurred, the frictional resistance between the wedge 30 and the inclined track 28 is sufficient to resist downward movement of the upper plate which would normally result from its own weight.

Accordingly, during the cooking process, after the batter has expanded to raise the lid portion 12 to its displaced position, substantially as illustrated in Fig. 2, such upwardly displaced position will be maintained throughout the remainder of the cooking cycle so that the emergent waffle rather than being a squashed product, will always be somewhat thicker and more open-textured. The amount of displacement of the upper plate 20 will vary dependent upon the amount and character of the waffle batter, but once the raised position is attained, it will thereafter be maintained by the wedge mechanisms 26.

To enable the return of the upper plate 20 into abutting relationship with the lower plate 18 preparatory to the instigation of a succeeding cooking cycle, means are provided to positively move the wedge 30 to the left, as viewed in Fig. 2, to thereby release the lid portion 12 from its raised position. Conveniently, such means takes the form of a cam 40 pivotally supported, as indicated at 42, at the side of the lid portion 12 adjacent the end of the wedge 30 remote from the spring 34. Such cam 40 is actuated manually by the grasping of an attached handle 44 that also serves to the pivotal lifting of the lid portion 12 about the hinge 14 to the position illustrated in Fig. 1. When the handle 44 is grasped to lift the lid portion 12, such handle moves about the pivot 42 in the direction of the arrow A in Fig. 2 which brings the high portion of the cam 40 against the wedge 30 to move the same to the left so that simultaneously with the opening of the iron for the insertion of new batter, the wedge mechanism 26 is automatically reset for the instigation of another cooking cycle. Preferably, a stop 46 is positioned adjacent the cam 40 to limit the pivotal movement thereof in both directions.

Various alterations and modifications can obviously be made without departing from the spirit of the invention. Consequently, the foregoing description of a preferred embodiment of the invention is to be considered as purely exemplary and not in a limiting sense; the scope of the invention being indicated by the appended claims.

What is claimed is:

1. A waffle iron comprising upper and lower gridded plates, means forming a track on one of said plates in inclined relationship with the plane defined thereby, an inclined wedge supported from the other of said plates for movement in parallelism with the plane defined by said other plate, said wedge being arranged to engage said track whereby movement of said wedge varies the relative displacement of said two plates, and spring means constantly urging said wedge in one direction.

2. A waffle iron according to claim 1 which comprises manually operable means for moving said wedge in a direction opposed to the action of said spring means.

3. A waffle iron comprising upper and lower gridded plates, means forming a pair of tracks at opposite sides of said lower plate and inclined relative to the plane defined by said plate, a pair of inclined wedges supported from said upper plate for movement in parallelism to the plane defined thereby, said wedges being arranged to engage said tracks whereby simultaneous movement of said wedges effects an even displacement of said upper plate relative to said lower plate, and spring means urging each of said wedges in a direction to effect increased displacement of said plates relative to one another.

4. A waffle iron according to claim 3 which comprises means hingedly connecting said plates whereby pivotal movement and limited displacement therebetween is enabled, and means including a cam pivotally supported on said upper plate adjacent each of said wedges for manually moving said wedges against the action of said spring means.

References Cited in the file of this patent
UNITED STATES PATENTS

| | | |
|---|---|---|
| 1,866,874 | Barnes et al. | July 12, 1932 |
| 2,033,060 | Anderson | Mar. 3, 1936 |
| 2,033,067 | Fromknecht | Mar. 3, 1936 |
| 2,211,900 | Leavitt | Aug. 20, 1940 |
| 2,566,915 | Young | Sept. 4, 1951 |